Dec. 10, 1957     H. WEINBERGER     2,815,706
MULTIPLE SKEWER
Filed June 29, 1955
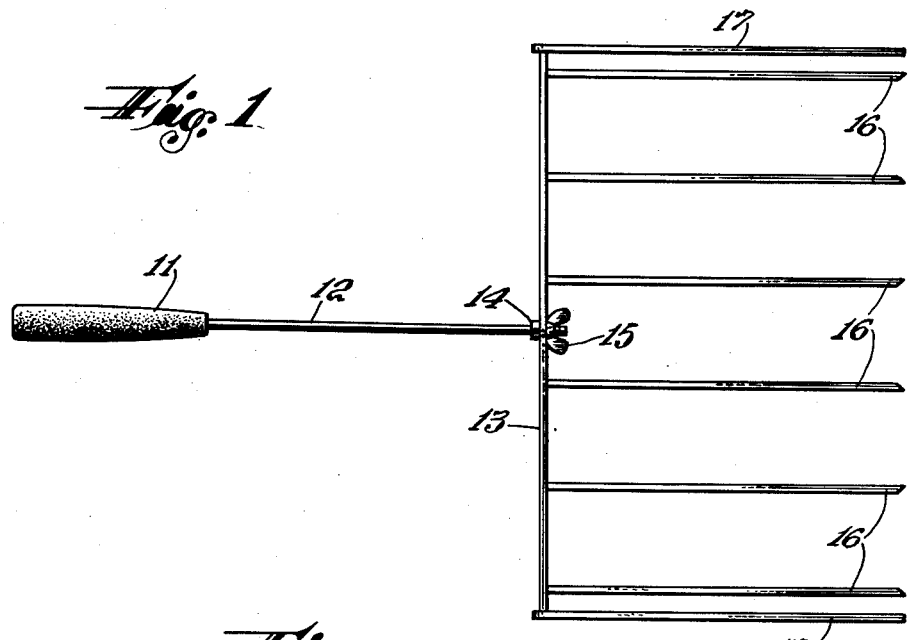
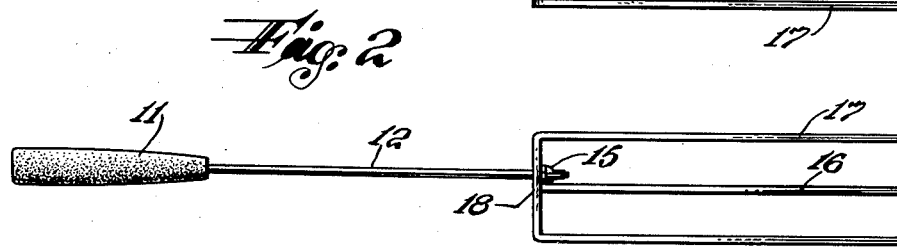
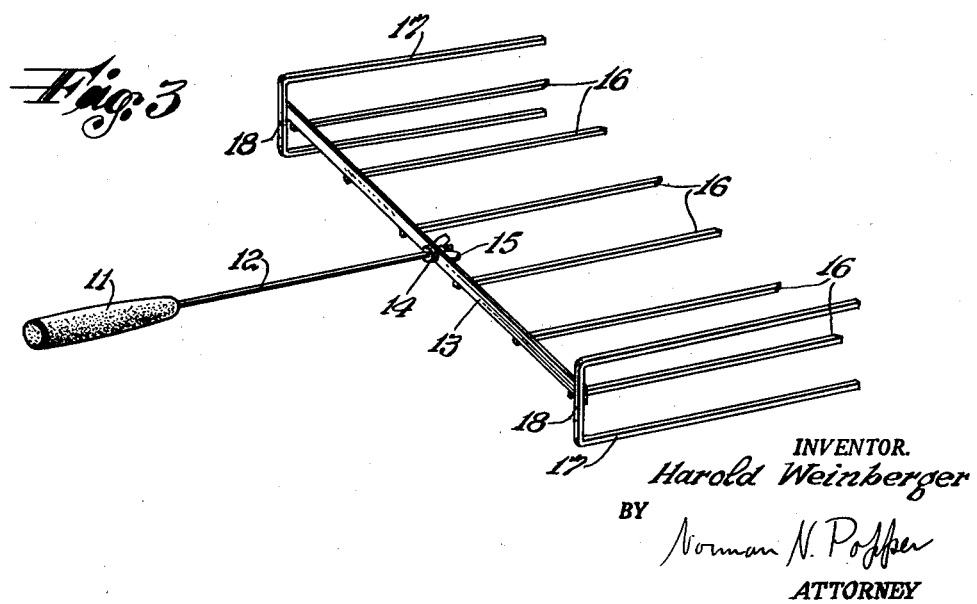
INVENTOR.
Harold Weinberger
BY
Norman N. Popper
ATTORNEY ated Dec. 10, 1957

2,815,706

MULTIPLE SKEWER

Harold Weinberger, South Orange, N. J.

Application June 29, 1955, Serial No. 518,819

3 Claims. (Cl. 99—419)

My invention relates generally to multiple skewers and specifically to a multiple skewer having provisions for holding the skewers in spaced relation to a surface upon which the multiple skewer rests.

It is among the objects of my invention to provide a multiple skewer which will be useful in the preparation of foods known as shashlik or shish-kabob.

It is a further object of my invention to provide a multiple skewer which will enable the handling of a plurality of skewers at the same time.

It is yet a further object of my invention to provide a multiple skewer which maintains each of a group of skewers in identical spaced relationship to a heat source.

A still further object of my invention is to provide a multiple skewer which may rest on a surface and will suspend the skewers above that surface so that the contents of the skewers, i. e., the food disposed thereon, will not be disturbed by contact with the surface upon which the skewer rests.

Yet another object of my invention is to provide a multiple skewer in which the plurality of pointed tines are disposed in spaced parallel relationship to each other, and the supporting means is likewise secured to the multiple skewer.

These objects and advantages, as well as other objects and advantages, may be achieved by the device illustrated in the drawings in which Figure 1 is a top plan view of my multiple skewer. Figure 2 is a side elevational view thereof, and Figure 3 is a view in perspective.

Referring now to the drawings in detail, my multiple skewer is provided with a handle 11. Inserted into the handle and projecting forwardly therefrom is a shaft 12 with a threaded end. This shaft 12 is connected to a cross-member 13 or bar, through the use of a nut 14 and a wing-nut 15. By this means, the handle is detachable from the cross-bar. A plurality of skewers 16 are attached to the cross-bar 13. They may be attached in any desired manner but preferably should be welded thereto parallel with each other. At each end of the cross-bar 13, there is welded a U-shaped spacing member 17. These spacing members are secured to the cross-bar 13 at their mid-point 18. Since the prongs of the spacing members 17 are disposed in parallelism to each other, whenever the multiple skewer is placed upon a flat surface, the prongs serve to position the skewers 16 the desired distance above the object upon which the multiple skewer rests. When the device is inverted by being picked up by the handle and turned over, the U-shaped members will cause the skewers 16 still to be always disposed a suitable distance above the surface upon which the multiple skewer rests. Both the spacing members 17 and the skewers 16 are disposed perpendicular to cross-bar 13.

The result is that when my multiple skewer is placed upon a suitable surface, as for example a grill, under which a fire is bruning, the food on each of the skewers will be maintained an equal distance from the flames, and when it is done on one side, the multiple skewer may be inverted and rested upon the opposite side of the spacing member 17.

I have shown a multiple skewer with six prongs so it is possible to serve and prepare six portions at one time, and each will be uniformly cooked. Of course, any number of skewers may be used.

The use of my multiple skewer is simply to spit the food pieces, which are to be roasted or grilled, until each skewer is full; then the multiple skewer may be rested upon the grill extending over the flames of the fire. It may be turned from time to time. Ultimately, the food will be cooked and may be discharged from the skewer to be consumed or may be transferred to another skewer, if it is desired to serve it on a skewer.

The foregoing is intended merely to be illustrative of one embodiment of my invention, for many changes may be made in the construction, selection, and arrangement of the parts, all within the scope of the appended claims without departing from the spirit of the invention.

I claim:

1. A multiple skewer comprising a bar, a plurality of skewers attached to the bar, said skewers being disposed in spaced relation to each other and perpendicular to the bar, a means for lifting the bar, U-shaped spacing members co-extensive with the skewers attached to the cross-bar at the center of the U-shaped portion with the upper legs of the U-shaped spacing members disposed in a plane substantially spaced above the skewers and the lower legs of the U-shaped spacing members disposed in a plane substantially spaced below the skewers.

2. A multiple skewer comprising a bar, a plurality of skewers attached to the bar, said skewers being disposed in spaced relation to each other and perpendicular to the bar, a handle secured to the bar disposed perpendicularly thereto on the opposite side from the skewers, and U-shaped spacing members co-extensive with the skewers attached at their mid-portion to the cross-bar with the upper legs of the U-shaped spacing members disposed in a plane substantially spaced above the skewers and the lower legs of the U-shaped spacing members disposed in a plane substantially spaced below the skewers.

3. A multiple skewer comprising a bar, a plurality of skewers attached to the bar, said skewers being disposed in spaced relation to each other and perpendicular to the bar, a handle secured to the bar disposed perpendicularly thereto on the opposite side from the skewers, and U-shaped spacing members co-extensive with the skewers attached at their mid-portion to the cross-bar with the said spacing members disposed parallel to the skewers with the upper legs of the U-shaped spacing members disposed in a plane substantially spaced above the skewers and the lower legs of the U-shaped spacing members disposed in a plane substantially spaced below the skewers.

References Cited in the file of this patent

UNITED STATES PATENTS

| 2,619,896 | Ross | Dec. 2, 1952 |

FOREIGN PATENTS

| 155,715 | Great Britain | Dec. 30, 1920 |
| 396,074 | Great Britain | July 8, 1933 |
| 478,044 | Great Britain | Jan. 11, 1938 |
| 940,747 | France | June 7, 1948 |